United States Patent [19]
Stanfill, Jr.

[11] Patent Number: 5,146,813
[45] Date of Patent: Sep. 15, 1992

[54] INSTALLATION AND REMOVAL TOOL FOR FIBER OPTIC CONNECTORS

[76] Inventor: Willis H. Stanfill, Jr., 4414 NE. Irving, Portland, Oreg. 97213

[21] Appl. No.: 746,354

[22] Filed: Aug. 15, 1991

[51] Int. Cl.⁵ .............. B25B 13/04; B25B 13/00; B25B 13/28; B25B 13/48
[52] U.S. Cl. .................................. 81/120; 81/52; 81/111; 81/176.1
[58] Field of Search ............ 81/3.4, 3, 4, 52, 53.1, 81/53.2, 57.15, 57.33, 111, 122, 120, 176.1, 176.15, 176.2, 176.3, 484, 488

[56] References Cited

U.S. PATENT DOCUMENTS

| | | | |
|---|---|---|---|
| H226 | 3/1987 | Willett. | |
| 1,963,833 | 6/1934 | Cullnan | 81/111 |
| 2,522,038 | 9/1950 | Houghton | 81/120 |
| 2,794,354 | 6/1957 | Cozart | 81/484 |
| 2,959,995 | 11/1960 | Linden | 81/120 |
| 4,095,492 | 6/1978 | Makela | 81/176.1 |
| 4,512,215 | 4/1985 | Krauchick | 81/176.1 |
| 4,641,554 | 2/1987 | Klann | 81/52 |
| 4,912,841 | 4/1990 | Noschese. | |
| 4,945,791 | 8/1990 | Herschler | 81/120 |

*Primary Examiner*—Frank T. Yost
*Assistant Examiner*—Paul M. Heyrana, Sr.
*Attorney, Agent, or Firm*—Kolisch, Hartwell, Dickinson, McCormack & Heuser

[57] ABSTRACT

A device for manipulating a connector which has an open-ended socket portion that receives a connector. The socket portion has a slot extending along its side for receiving a lead extending from the connector. Tabs limit the extent that a connector may move into the socket portion. A circumferential cut-out in the socket portion accommodates movement therethrough of selected latch edges of a grab member. An elongate shaft joined to the grab member extends away from the socket portion and provides a handle.

9 Claims, 2 Drawing Sheets

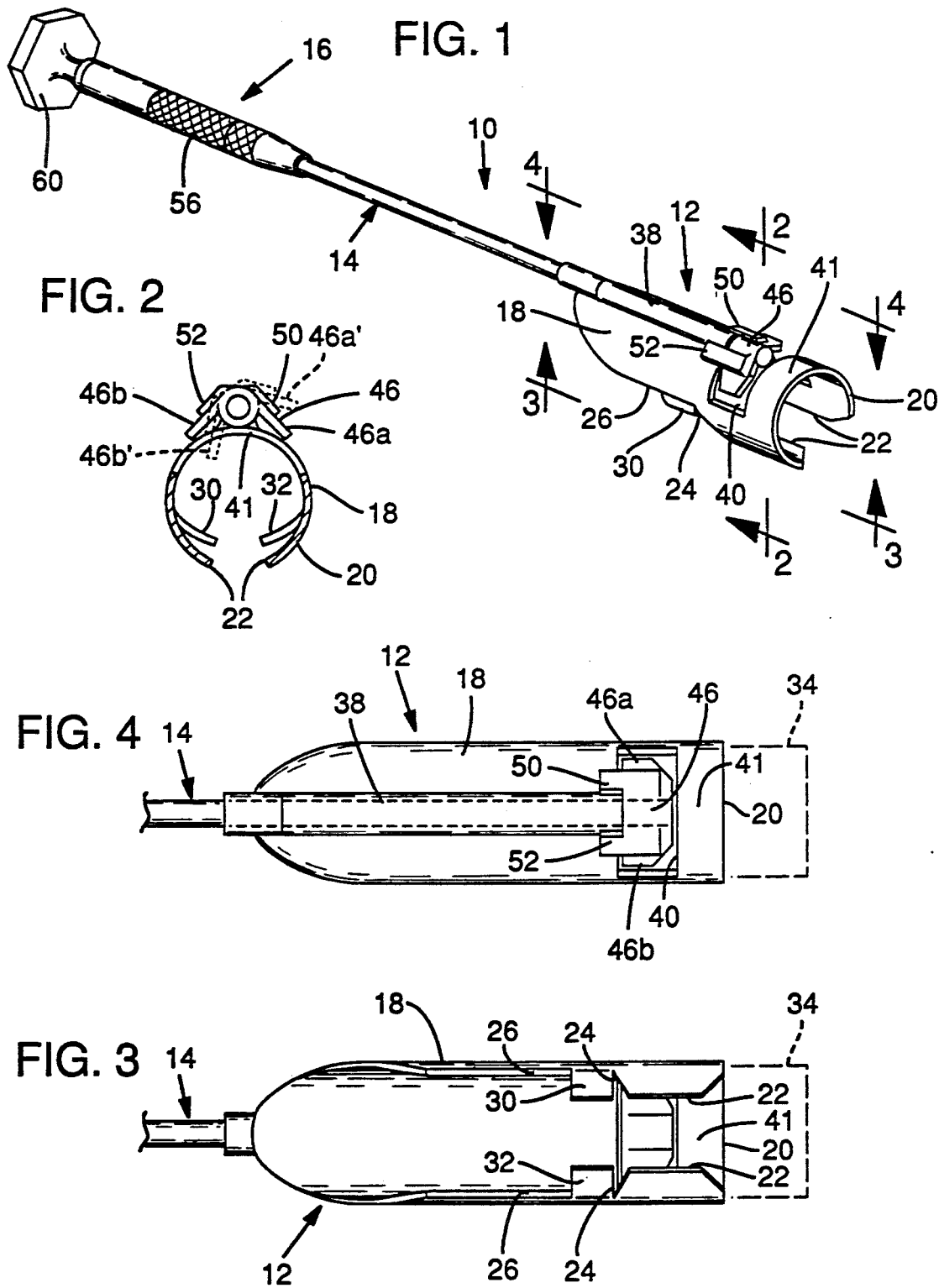

INSTALLATION AND REMOVAL TOOL FOR FIBER OPTIC CONNECTORS

BACKGROUND AND SUMMARY OF THE INVENTION

This invention relates to a manipulator device and more particularly to a manipulator device which has means for supporting a connector and which is usable in mounting the connector on a mating connector which is part of a junction box or terminal. For instance, in a fiber optic network, a connector which includes a plug may be part of a fiber optic cable, and it is desired to connect this connector with a mating connector in the form of a receptor for the plug which is part of a terminal. Quite frequently, a cluster of cables are provided extending from a terminal and, by reason of the cluster presence, space limitations are such that it is difficult without a tool to grip and turn the connector in establishing a connection with the terminal. The manipulator device of the invention is a tool which enables a connector to be gripped and held and manipulated from a location remote from where actual connection is established.

An object of the invention is to provide an improved manipulator device which is easily fitted about a connector and then easily manipulated using, if desired, one hand to establish a mounted condition for the connector on a terminal.

Among specific objects of the invention is the provision of improved means for receiving and accurately positioning a connector on a tool, the provision of a manipulator with an improved grab or latching mechanism for establishing frictional contact with a connector whereby torque may be transmitted to the connector, and the provision of a manipulator for a connector with a construction which affords easy manipulation with one hand.

BRIEF DESCRIPTION OF THE DRAWINGS

These and other objections and advantages are attained by the invention, which is described hereinbelow in conjunction with the accompanying drawings, wherein:

FIG. 1 is a perspective view of a manipulator device constructed according to an embodiment of the invention;

FIG. 2 is a cross-sectional view, on a slightly larger scale, taken generally along the line 2—2 in FIG. 1;

FIG. 3 is a side view along the line 3—3 in FIG. 1 showing details of a socket portion in the manipulator;

FIG. 4 is a view taken generally along the line 4—4 in FIG. 1;

DETAILED DESCRIPTION OF A PREFERRED EMBODIMENT

Figure 5:
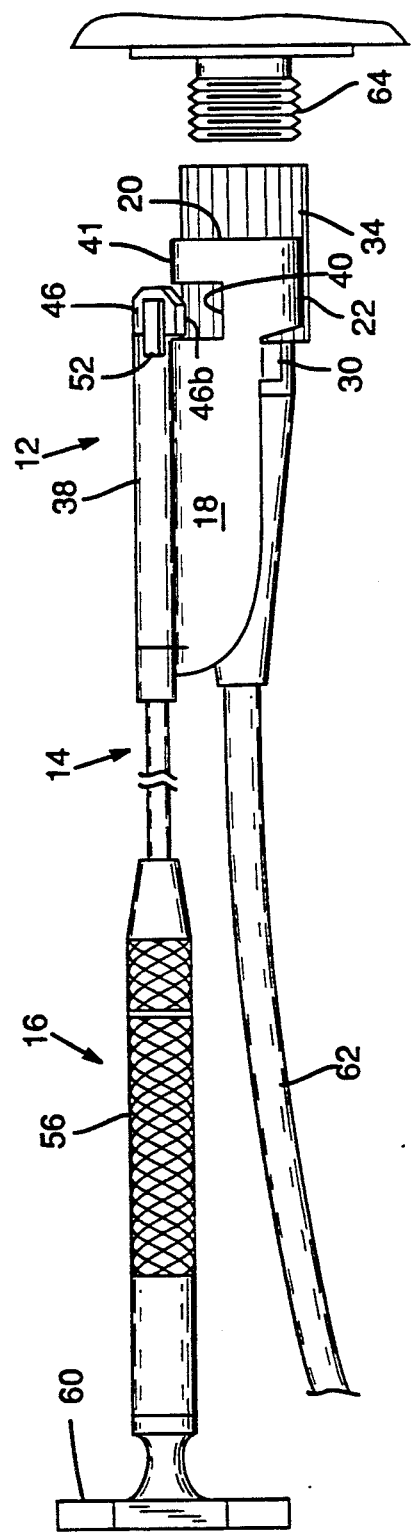
FIG. 5 illustrates how the manipulator may be used in mounting a connector against a receptor plug supported on a terminal.

Referring to the drawings, and, first of all, initially to FIGS. 1-4, a manipulator device as contemplated herein is illustrated generally at 10. Such includes a socket portion 12 at one end of the device, and an elongate shaft 14 which functions as a handle and also as an actuator for a grab element in the device. The gripped portion of the handle is shown at 16.

Considering the socket portion, it is formed by an elongate cylindrical sleeve 18 with an open end 20 that receives the connector. A slot 22 extends axially along a side of a sleeve. The sleeve is cut-away at regions 24, 26 to leave sleeve tabs 30, 32. These tabs are bent or deformed inwardly slightly into the interior of the sleeve to provide stop shoulders limiting the extent that a connector may be inserted into the sleeve. This is illustrated by the connector shown in dotted outline 34 in FIG. 3 which has the end abutting these turned in tabs.

Shaft 14 is rotatably supported in a tube section 38 which extends axially along the sleeve and is joined to the outside of the sleeve. The shaft is straight in FIGS. 1 and 5, but it could also be bent or offset so that the longitudinal axis of gripped portion 16 is in line with the longitudinal axis of the socket. The shaft can be flexible or stiff and can be made of metal, plastic or other suitable material.

Intermediate open end 20 and tabs 30, 32, in the side of the sleeve opposite the side having slot 22, is a circumferentially extending cut-out 40. With the cut-out inwardly from the open end, a band of material 41 is left forming part of a continuous ring at the open end of the sleeve. The presence of this ring forming the lead end of the instrument is important in that it facilitates ease of mounting of the instrument on a connector. A rubber surface (not shown) may be attached to the interior of band 41 to provide greater friction between the socket and a connector. The rubber surface is particularly useful in removing the connector after it has been disconnected from a terminal.

Joined to shaft 14 where such extends beyond tube section 38 is a grab member 46, also referred to as a latch element. As best illustrated in FIG. 2, the element extends generally transversely of the shaft to which it is mounted, and has ends 46a, 46b disposed on opposite sides of the shaft. With shaft 14 rotated in a counterclockwise direction in FIG. 2, end 46a is advanced into the interior of sleeve 18, as illustrated by end 46a' shown in dashed outline in FIG. 2. Rotation of shaft 14 in the opposite direction shifts the other end of the element into the interior of the sleeve.

Element 46 has a concave side which faces inwardly (the downwardly facing side of the element in FIG. 2). With ends 46a, 46b positioned so that both are essentially along the outside of sleeve 18, this provides clearance for a connector to travel past the element without being impeded by the element.

Ears are shown at 50 and 52 which are joined to shaft 14 and project laterally outwardly to opposite sides of the shaft in a region overlying the wall of sleeve 18 adjacent cut-out 40. The ears constitute limit means limiting or restraining unrestricted relative motory movement of the shaft relative to sleeve 18. With shaft 14 rotated in one direction, ear 50 is advanced into the wall of the sleeve to prevent further relative rotation, and in the opposite direction ear 52 strikes the wall of the sleeve.

Shaft 14, in gripped portion 16, has a slightly larger diameter which makes for easier gripping with the fingers. Further, such may include a knurled expanse 56 further contributing to gripping by the fingers. The shaft terminates in a palm rest portion 60 which is relatively rotatably mounted with respect to the end of the shaft.

Briefly describing how the device may be used, the device may be held with one hand with the fingers of that hand gripping expanse 56 and rest portion 60 against the palm. This enables the shaft 14 to be rotated using the fingers, with socket portion 12 rotating while swinging in a tight arc. Assisting in the positioning of the socket portion, by preventing free swinging of the socket portion on the end of the shaft, are ears 50, 52. With the socket portion properly positioned with respect to the connector such may be advanced over the connector, to seat the connector in a position where the end of the connector is against tabs 30, 32, as shown in FIG. 5.

Any line such as the optic cable shown at 62 extending from the connector, is permitted entry into the socket portion through slot 22. With the connector positioned as described, it is easily placed in proper registering position with a complementary connector located on a terminal board such as that shown in 64 in FIG. 5. Using the tool, the connector may be advanced over the complementary connector, and rotated, to firmly mount it in place. With the socket portion rotated in a direction causing tightening, an appropriate end of the grab element moves into and through cut-out 40 to lock against the surface of the connector which lies therebelow.

Figure 6:
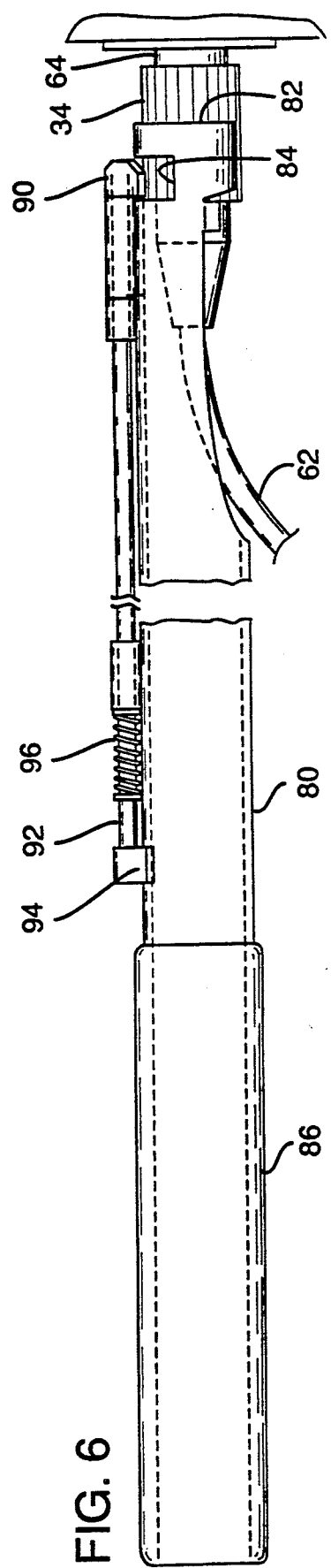
FIG. 6 is a view illustrating portions of a manipulator according to a modified form of the invention.

FIG. 6 illustrates a modified form of the invention. In this modification, an elongate hollow cylinder or sleeve 80 has an open end 82 and a circumferential cut-out 84. Not shown (as facing away from the viewer in FIG. 6) is a slot which is provided in the tube corresponding to slot 22 in the first modification of the invention. The end of the sleeve 80, cut-out 84, and this slot provide a socket portion which is essentially the same as the socket portion earlier described.

In this modification of the invention, however, the sleeve extends the length of the tool, and the sleeve provides the handle by which the tool is manipulated. The gripped portion of the tool is shown at 86.

As in the first modification of the invention, a gripper element is provided, shown at 90, and this has ends which are selectively moved through cut-out 84. The gripper element is rotated by an actuator shaft 92 which is journaled in a position extending along the outer side of sleeve 80. To assist the operator in rotating the actuator shaft, a handle tab, such as is shown at 94, may be provided secured to the shaft.

In the invention shown in FIG. 6, the shaft is biased by spring 96 to a position where ends of the gripper element 90 are equally spaced from the center of the tube. One or the other may be advanced into the interior of the tube against the biasing of the spring, and with depressing of a handle tab 94.

With the invention as shown in FIG. 6, when grip portion 86 is revolved through operation of the hand, its rotation is directly imparted to the socket portion of the tool formed by the end of sleeve 80. This is to be compared to the arcuate swinging movement imparted socket portion 12 by rotation of shaft 14.

While modifications of the invention have been described, it should be obvious that other variations and modifications are possible, without departing from the invention as herein claimed.

It is claimed and desired to secure by Letters Patent:

1. A manipulator device for manipulating a connector from a remote position comprising:

a socket portion adapted to be fitted about the connector having a hollow interior and an open end for receiving the connector, an elongate handle mounted on said socket portion and extending axially of said socket portion in a direction away from said open end, stop means mounted on the socket portion limiting the extent of movement in a direction extending axially of the socket portion of a connector into the socket portion, an elongate slot extending in an axial direction along a side of the socket portion inwardly from said open end, said slot means comprises a stop shoulder disposed, in a direction extending axially of the socket portion, intermediate the ends of the slot, and a movable grab element disposed adjacent one side of the hollow interior of the socket portion and circumfrentially spaced from the slot and toward said open end from said stop means and actuatable to move against and to grab a connector residing within said socket portion.

2. The manipulator device of claim 1, wherein said socket portion is an open-ended cylindrical sleeve, the slot is formed in a side of the sleeve, and the stop shoulder is formed by a deformed portion of the sleeve.

3. The manipulator device of claim 1, wherein said grab element comprises an eccentric element rotatably mounted for movement about an axis disposed laterally to one side of the axis of the socket portion, and said grab element has a concave side terminating in opposed latch edges and said side facing the axis of the socket portion, rotation of the eccentric element being operable to swing a latch edge radially inwardly on the socket portion.

4. The manipulator device of claim 3, wherein said handle is an elongate rod joined to said grab element and mounted for rotation relative to said socket portion.

5. A manipulator device for manipulating a connector comprising:

a socket portion having an open end for receiving the connector, a shaft rotatably mounted on the socket portion extending axially out from the socket portion away from the portion's said open end, a grab element mounted on said shaft disposed on one side of the interior of the socket portion and movable with rotation of the shaft radially inwardly on the socket portion, the socket portion having a slot extending along the side thereof inwardly from its said open end, the shaft having an expanse remote from the socket portion which is exposed and finger engageable by a user, and limit means interposed between the socket portion and shaft serving to limit relative free rotation between the two.

6. A manipulator device for manipulating a connector comprising:

an open-ended socket portion, a shaft rotatably mounted on the socket portion and extending axially on the socket portion away from its said open end, a grab element mounted on said shaft disposed to one side of the interior of the socket portion and movable with rotation of the shaft radially inwardly on the interior of the socket portion, a slot extending along the socket portion in an axial direction inwardly from its said open end, the shaft having an expanse remote from the socket portion which is exposed and finger engageable by a user, said shaft terminating in an end remote from the socket portion, and a palm rest on said remote end.

7. The manipulator of claim 6, wherein said palm rest is rotatable relative to said shaft.

8. A manipulator device for manipulating a connector comprising:

an elongate sleeve having an open end forming a socket for receiving a connector, a slot extending along said sleeve inwardly on the sleeve from its said open end, a circumferentially extending cut-out in said sleeve spaced axially inwardly from the sleeve's open end, and an eccentric grab member rotatably mounted on said sleeve movable with rotation of the member inwardly on the sleeve and through said cut-out.

9. The manipulator device of claim 8, which further includes an elongate shaft joined to said eccentric member rotatably mounted on the sleeve for rotating the eccentric grab member, the shaft having an expanse remote from the sleeve which is exposed and finger engageable by the user and the shaft further terminating in an end remote from the sleeve which has a palm rest thereon.

* * * * *